This invention relates to a camera and more particularly to an improved camera accessory to enable supporting and adjusting the lens of the camera and means for associating the accessory to the camera.

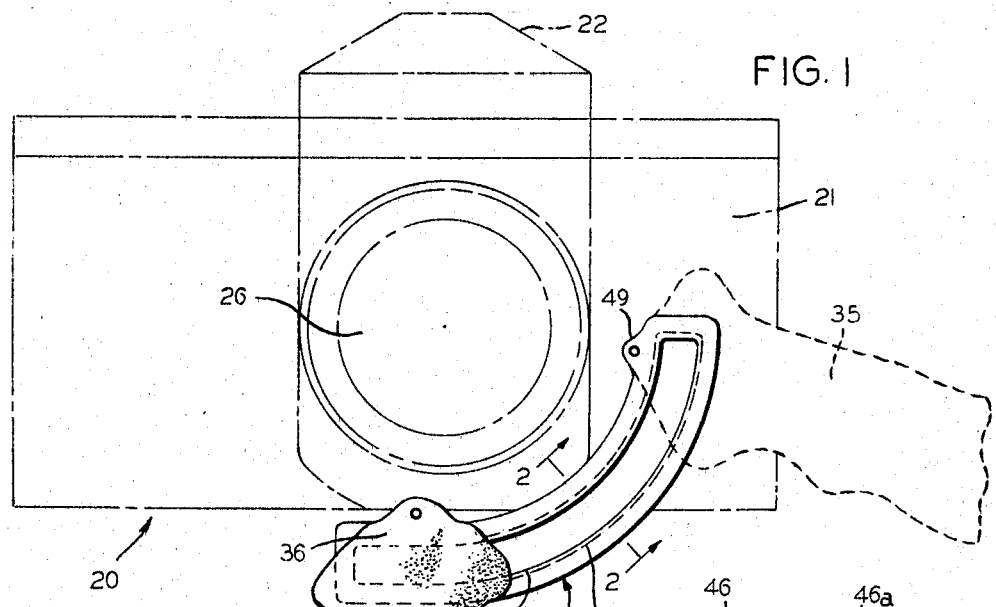
FIG. 1
FIG. 2
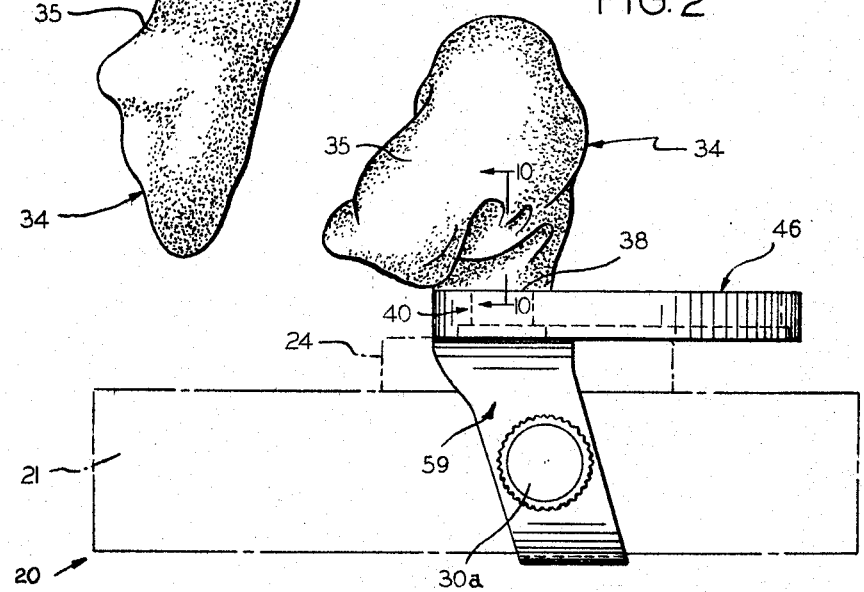
FIG. 3
INVENTOR.
DAVID ROBINSON
BY
Mullin and Alter
ATTORNEYS

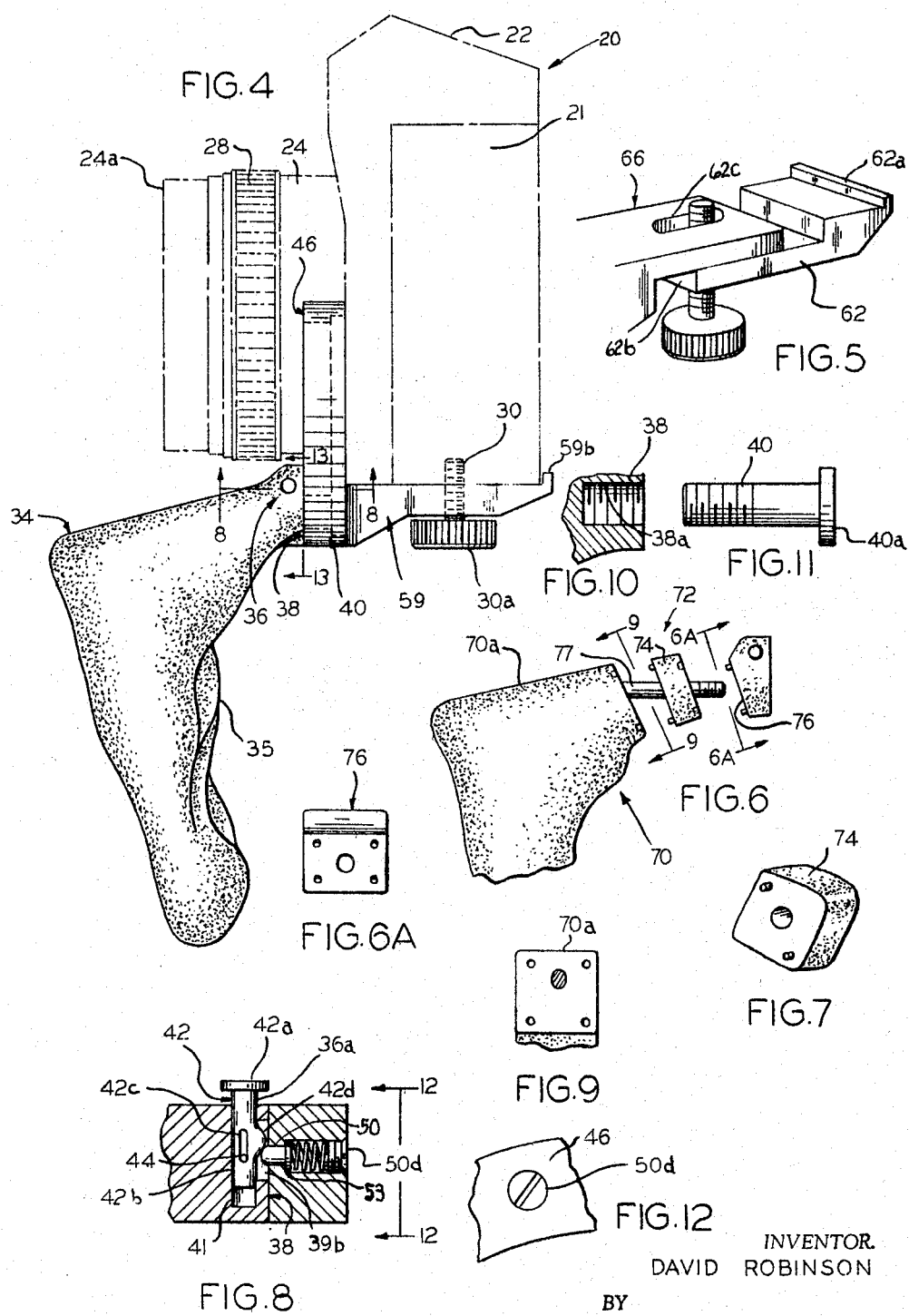

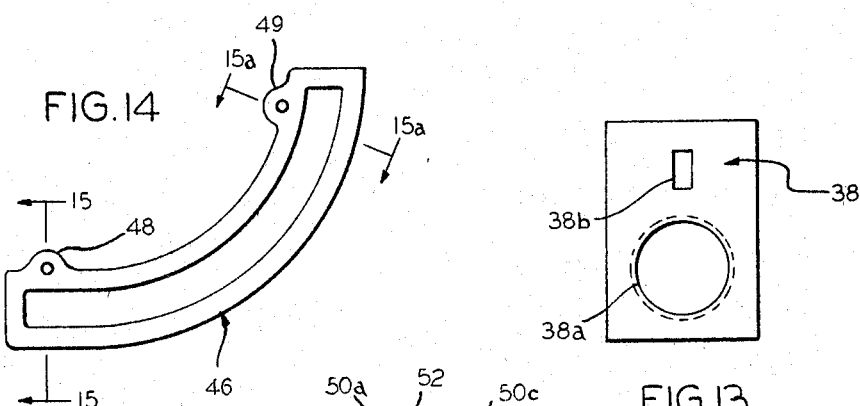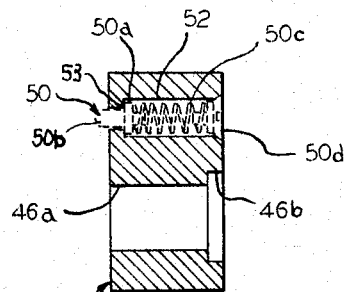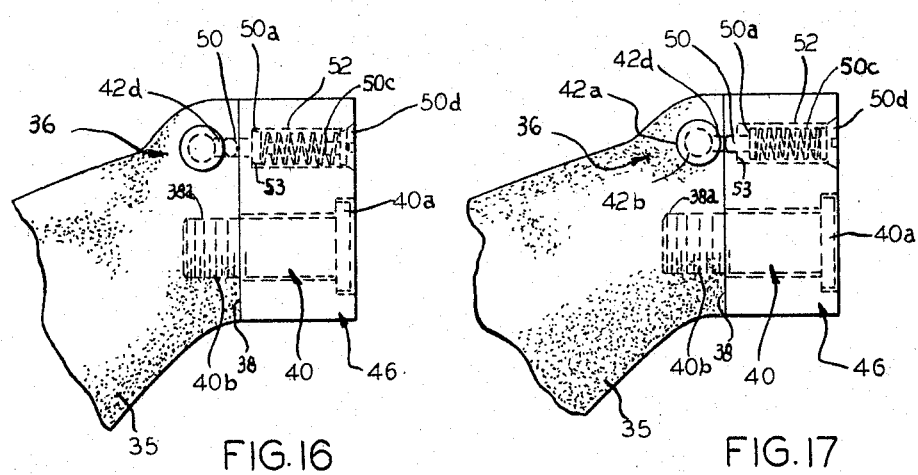
INVENTOR.
DAVID ROBINSON
BY
Mullin and Alter
ATTORNEYS 3,263,588
CAMERA ACCESSORY
David Robinson, 4750 N. Clarendon, Chicago, Ill.
Filed Apr. 17, 1964, Ser. No. 360,621
7 Claims. (Cl. 95—86)

There have been many structures taught in the prior art which have been made to provide a comfortable grip which will enable the user of a camera to hold the camera with steadiness with one hand. Such a grip has provided free use of the other hand so that the other hand can be used for adjusting the lens of the camera or for actuating the shutter of the camera or for even holding a flash bulb. These prior art devices have been suitable for these purposes but their drawback is that while they free one hand to adjust the lens or actuate the shutter they do not accomplish the objective of completely freeing the hand, which does not support the camera, from the task of adjusting the lens. And therefore while the free hand does not have to be used for supporting the camera, it still is not completely free because it must be used for adjusting the lens of the camera. Another drawback with prior art devices is that the grips which provide and assure maximum steadiness are not adjustable to enable one working with a 35 mm. camera or the like to take both vertical and horizontal pictures with the same amount of ease.

In my above identified copending design application I disclosed a camera accessory of a particular design which obviated the problems mentioned. The accessory enabled the user to both support the camera and adjust the lens thereof with the same hand. However, the design was merely associatable with a particular camera which is merely suitable for taking pictures with a vertical format.

Now, I have provided a new and improved camera accessory which enables the user thereof to comfortably grip a camera suitable for taking pictures with a vertical and horizontal format to assure the maximum amount of steadiness and facilitate the simultaneous focusing of the camera with the same hand. Also I have provided an adjustable grip which not only enables the user thereof to take a picture in more than one format with a minimum of effort and inconvenience, but I have also provided a construction which is universal and can be applied to any sized camera.

It is therefore an object of this invention to provide a new and improved camera which has a new and improved grip associated therewith.

It is still further an object of this invention to provide a new and improved grip which can be associated with a camera to enable the user thereof to both support the camera and simultaneously adjust the lens of the camera with the same hand.

It is still further an object of this invention to provide a new and improved grip which has the above objects and in addition thereto can be adjusted to take both vertical and horizontal pictures with a box-like rectangular camera, such as for example the 35 mm. type.

It is even still further an object of this invention to provide a means of associating an adjustable grip as hereinabove mentioned with cameras having a variety of widths or thicknesses.

Even still further it is an object of this invention to provide an adjustable grip which can be utilized with all types and sizes of cameras.

Other and further objects of this invention will become more readily apparent from viewing the drawings and reading the following description in conjunction therewith wherein:

FIGURE 1 is a front elevational view of a camera assembly associated with my new and improved grip;

FIGURE 2 is a sectional view taken on a plane passing through the line 2—2 and looking in the direction of the arrows;

FIGURE 3 is a bottom view of FIGURE 1;

FIGURE 4 is a side elevational view of FIGURE 1 illustrating the adjustable grip of my invention associated with a bracket which is removably attached to the bottom of the camera;

FIGURE 5 is an isometric view of a modified version of a bracket portion which is utilized to associate the adjustable grip with the bottom of a camera having a varied thickness;

FIGURE 6 is a side elevational view of a modified adjustable grip which enables my invention to be utilized with different sized cameras having their lenses disposed differently;

FIGURE 6a is a sectional view taken on a plane passing through the line 6a looking in the direction of the arrows;

FIGURE 7 is an isometric view of a removable and replaceable portion of FIGURE 6 which can be interchanged with other portions to vary the angle of the adjustable grip portion illustrated in FIGURE 6 so that it can be utilized with different sizes and shapes of cameras;

FIGURE 8 is a cross-sectional view taken on a plane passing through the line 8—8 in FIGURE 4 and looking in the direction of the arrows;

FIGURE 9 is a sectional view taken on a plane passing through the line 9—9 and looking in the direction of the arrows in FIGURE 6;

FIGURE 10 is a partial sectional view taken on a plane passing through the middle of the screw socket in the adjustable grip;

FIGURE 11 is a side elevational view of a bearing screw which is associated with the threaded socket bored in the flat edge of the rear of the adjustable grip illustrated herein;

FIGURE 12 is a rear elevation view of one of the quadrant slide portions grip retaining portions taken on a plane passing through line 12—12 and looking in the direction of the arrows in FIGURE 8;

FIGURE 13 is a side elevational view of the adjustable grips rear flat edge taken on a plane passing through the line 13 and looking in the direction of the arrows in FIGURE 4;

FIGURE 14 is a front view of the quadrant slide portion illustrating an unimpeded view thereof showing the first and second grip retaining portions;

FIGURE 15 is a sectional view taken on a plane passing through the line 15—15 and looking in the direction of the arrows in FIGURE 14, said views being the same as that taken on a plane passing to the line 15a—15a looking in the direction of the arrows in FIGURE 14;

FIGURE 16 is a side elevational view of the adjustable grip showing it associated with the quadrant slide portion when one of the set buttons of the grip retaining portions are in their locked position and retaining the adjustable grip in one of the grip retaining positions; and FIGURE 17 is the same side elevational view as FIGURE 16 wherein one of the set buttons is illustrated in its released position and the adjustable grip is free to move in between the first grip retaining portion and the second grip retaining portion.

Referring more specifically to the drawings wherein like characters of reference indicate corresponding parts, I have illustrated a preferred embodiment of my invention associated with an ordinary camera 20 having a body 21 of rectangular box-like shape such as, for example, an ordinary miniature 35 mm. camera would have, such a camera of course being suitable for taking pictures with both horizontal and vertical formats. As illustrated in FIGURES 1, 3, and 4, the camera has a view finder 22 projecting outward from the top of the camera and a cylindrical barrel like projection 24 extending outward of the center of the camera and having lens 26 at the outward end 24a thereof. An ordinary manual lens adjusting means such as the lens adjusting wheel 28 is associated with the cylindrical barrel like portion 24 at the outer end 24a thereof. A conventional downwardly extending threaded socket 30 is disposed at the bottom of the camera and it receives a tripod screw 30a which is threadedly associated with it.

My new and improved adjustable grip 34, which I have hereinabove mentioned, is associated with the camera 20 as I will hereinafter explain and it is adjustable and positionable to enable the operator of the camera to grip the handle portion 35 thereof with one hand and adjust the lens 26 of the camera with the fingers of the same hand simultaneously. The grip 34 has a flat edge 38 at the rear of the top portion 36 thereof and a threaded screw socket 38a is formed in the flat edge 38. Also a cylindrical bore 41 is formed in the top side portion 36a of the grip and the bore communicates with the set button opening 38b formed in the flat edge 38 intermediate the ends of the cylindrical bore 41. As fully illustrated in FIGURE 8, a cam actuating means 42 having a flat button like head 42a with a cylindrical stem 42b extending from it is received by the cylindrical bore 41. The stem has a cam surface 42d formed on the side thereof with a longitudinal slot 42c formed through substantially the middle thereof. The cam surface 42d projects inwardly of the set button opening 38b which communicates with the flat edge 38 and the cylindrical bore 41 as hereinabove mentioned. A positioning peg 44 extends across the sides of the cylindrical bore 41 and protrudes through the longitudinal slot 42c formed therein to stabilize the cam actuating means when the stem is inserted into the bore as illustrated in FIGURE 8.

An adjustable means such as the arcuate shaped quadrant slide portion 46, having a bracket portion 59 extending transversely therefrom at the bottom thereof and having an elongation equal to the width of the camera, is illustrated alone in FIGURE 14 and in relation to the camera 20 in FIGURES 1, 3, and 4. The bracket portion 59 has a slot portion 59a formed therein which enables it to be removably associatable with the tripod screw 30a extending from the bottom of the camera and an upright projecting portion 59b extends from the rear end of the bracket to enable the bracket to wrap around the camera 20 at the rear thereof when the quadrant slide portion is associated with the camera and has the tripod screw 30a protruding through the slot portion 59a and being received by the downwardly extending socket 30, illustrated in FIGURE 4. As seen from the drawings, the quadrant slide portion 46 is disposed in the front of the camera when it is in its operative position and has the curved channel 46a formed therein with an arcuate countersunk slot 46b at the bottom thereof sized to receive the circular head 40a of the bearing screw 40 which has a threaded portion 40b that is readily associated with the threaded screw socket 38a. Referring to the FIGURE 14, the quadrant slide portion 46 has a first grip retaining portion 48 and a second grip retaining portion 49 extending from the top of the quadrant slide portion. Each of the grip retaining portions are constructed and disposed to releasably lock the adjustable grip 34 into a grip retaining position when the grip is associated with the quadrant slide portion. The first grip retaining portion 48 is disposed at one extremity of the quadrant slide portion to releasably lock the adjustable grip into a first grip retaining position illustrated in FIGURE 1 by the solid lines defining the grip 34, whereby the user can take a picture with a horizontal format while using the same hand to support the camera by holding the grip and adjusting the lens with the fingers of the same hand. The second grip retaining portion 49 is disposed at the other extremity of the quadrant slide portion to lock the grip into a second grip retaining position, as shown by the dotted lines of FIGURE 1, to enable the user to take a picture with a vertical format in a like manner by merely causing the grip to be released from its locked-in position and moved into its second grip retaining position, as will be explained hereafter.

Each of the grip retaining portions 48 and 49 have a countersunk bore 52 formed therein with a spring biased set button 50 which has a cylindrical shoulder portion 50a that is biased against the shoulder 53 of the countersunk bore.

The set buttons have a locked position and a released position, as illustrated in FIGURES 16 and 17. When a set button is in its locked position, the dome portion 50b of the set button projects outward of the grip retaining portion by being actuated by the spring biasing means 50c which are held in position by the screws 50d as illustrated in FIGURES 8, 12, and 16. The set buttons are in their unlocked position when the dome portions 50b are depressed into the countersunk bore 52 as illustrated in FIGURE 17. From the different positions described herein, it is realized that the dome portion 50b of each of the grip retaining portions is disposed for cooperation with the cam surface 42d and protrudes through the set button opening 38b in the flat edge 38 of the adjustable grip 34 so that when the domes are in their locked position the adjustable grip is locked in position and prevented from sliding along the quadrant slide portion.

From the arrangement illustrated in FIGURES 8, 16, and 17, it will be seen that the cam actuating means 42 has its cam surface 42d disposed in the set button opening 38b of the adjustable grip when in its locked position. And by depressing the cam actuating means 42 the set buttons are caused to move to their released position. Also, when the cam actuating means 42 does not have any pressure applied thereto and the adjustable grip is disposed proximate to either of the grip retaining portions, the cam surface 42d cooperates with the dome 50b of the set buttons 50 to reset the actuating means to its raised position, as illustrated in FIGURES 8 and 16. The adjustable grip therefore is associated with the camera to enable pictures to be taken with both vertical and horizontal formats merely by putting pressure on the cam actuating means and moving the adjustable grip from its first grip retaining position to its second grip retaining position; and when the grip is positioned in either of the grip retaining positions it is set in its locked position by merely releasing the pressure on the cam actuating means.

From the description hereinabove and the drawings, it will become evident that the construction and operation of my device is simple. The adjustable grip can be made of a molded plastic which is formed to suit the anatomical features of the human hand thereby enabling the user thereof to grip the handle 35 of my device with the palm of his hand and the second, third, and fourth fingers so that the use of his thumb and forefinger is available for focusing the camera lens. When the adjustable grip is associated with the quadrant slide portion after said quadrant slide portion has been associated with the bottom of the camera by fastening the tripod screw to the camera and through the slot portion of the brackets, the adjustable handle of course can be moved from the first grip retaining position to the second grip retaining position so that the camera can be utilized for taking pictures which have either a vertical or horizontal format. When this is desired the cam actuating means is depressed and one of the set buttons is caused to move to its released position, as illustrated in FIGURE 17, to enable the circular head 40a of the bearing screw, which is associated with the adjustable grip, to be slid through the channel 46a of the quadrant slide portion 46. And when the adjustable grip is in either the first grip retaining position, as illustrated by the solid lines in FIGURE 1, of the second grip retaining position, as illustrated in the dotted lines of FIGURE 1, the adjustable grip can be put into its locked-in position by merely releasing the pressure on the cam actuating means; and in so doing, the set button is biased into the set button opening in the flat ends of the adjustable grip to prevent the adjustable handle from being able to be moved, as illustrated in FIGURE 8 and 16. Also, it should be realized that to operate this device it is not necessary to move the handle of the camera at all after the camera has been focused by using the view finder in the horizontal format position. All that need be done is to press the cam actuating means and move the camera with respect to the handle and maintain a steady grip and position of the handle so that after focusing is attained it is not necessary to get the camera out of focus by moving the handle because the handle, in being properly positioned to begin with, can act as a reference point to enable one to take pictures in the vertical format without moving this reference point.

In addition to the main concept taught herein, I have also provided different embodiments for both the bracket portions and the grip portions illustrated in FIGURES 1 through 4. The modifications which I am herein referring to have to do with attaching my device to different sizes of cameras wherein the width of the cameras might have different configurations or the lens adjusting wheel of the camera might have a smaller diameter or might be located differently with respect to the bottom of the camera. In FIGURE 5, I have provided an adjustable slide portion 62 which has an upwardly extending portion 62a at one end thereof which is intended to function in the same manner as the upright projecting portion 59b of the original bracket portion 59 illustrated in FIGURES 1 through 4. This adjustable slide portion 62 is flat at its other end 62b and has an elongated slot formed therein. It will be seen that the bracket portion illustrated in FIGURES 1 through 4 has been modified so that it is cut shorter and does not have the upright projecting portion 59b but rather it is flat. This modified form of the bracket portion is designated in FIGURE 5 by the character reference 66 and for the purposes of this application this modified form of the bracket will be referred to as the modified bracket portion. Therefore, with the construction illustrated in FIGURE 5 the quadrant slide portion 46 can be provided with the modified bracket portion 66 and the adjustable slide portion 62 and the tripod screw positioned so that it protrudes through both of the slots of these members and is received by the downwardly extending socket 30. Thereafter the adjustable slide portion 62 can be positioned to the point where it is coextensive with the width of the camera when the tripod screw is tightened.

As seen from FIGURE 6, I have also provided a modified grip construction 70 which enables my grip to be universal and applicable to all different types of cameras wherein the lens construction or other parts are of such a different relationship that it is necessary to have the adjustable handle be at a different attitude with respect to the camera. The modified adjustable grip has a main handle portion 70a which is formed in the same manner as the handle portion 35 hereinbefore described. However, the top portion 72 of the modified adjustable grip consists of a removable portion 74 and a top associating portion 76. The top associating portion 76 and removable portion are shown disassembled in FIGURE 6 with a threaded stud member 77 that protrudes from the main handle portion through the removable portion 74 and is received by the top associating portion so that when it is decided to assemble the structure, the top associating portion 76 is merely threaded tightly with the stud member until the removable portion 74 is sandwiched therebetween. It will be realized that with this type of structure the removable portion can be interchanged with other shapes of removable portions to achieve the results of having a grip which can be associated with the camera at different attitudes. Also, the top associating portion 76 is constructed in the same manner as the top portion of the grip hereinbefore described so that it can be associated with the quadrant slide portion to bring about the same results achieved by said grip 34. A removable portion 74 of a specific shape is illustrated in FIGURE 7; and FIGURES 6a and 9 show sectional views of surfaces of the top associating portion and grip respectively.

From reading the description in conjunction with the drawings it is seen that the objectives to be achieved by this invention have been met. I have provided a new and improved camera assembly which has a new and improved grip associated with it in a manner that enables one to simultaneously hold the camera and adjust the lens with the same hand. Still further, the adjustable means of associating the camera with the grip has enabled me to provide a camera with an adjustable grip which can be utilized for taking pictures both vertically and horizontally. Also in order that the adjustable grip can be universally associated with different sized cameras, I have provided a modified version of the grip which has a construction wherein the grip has a removable portion which can be interchanged with other removable portions to bring about association of the adjustable grip with the camera at a number of different attitudes. Still further, I have provided a modified bracket construction associated with the quadrant slide portion which enables me to associate my adjustable grip with cameras of different thicknesses. And therefore the objective of having an accessory which can be universally applied to different sized cameras is fulfilled.

It should be realized that even though I have disclosed particular embodiments for carrying out my invention, I do not intend my invention to be so limited. For instance the adjustable grip of my device could be molded in different fashions and it is entirely possible that instead of associating the grip with the particular quadrant slide portion that I teach, other adjustable means for associating the grip with the camera are intended, the important concept of my invention being therefore providing means for associating the adjustable grip with a camera to enable the grip to be disposed proximate and below the lens adjusting means of the camera for taking pictures by supporting and adjusting the camera and lens simultaneously with one hand. Also, it is entirely possible that other means of locking the adjustable grip into certain positions are contemplated besides the grip retaining portions including the set buttons and cam actuating means which I have set forth herein. Although I find it more advantageous to use this particular structure, it is not necessary for the purposes of my invention to have this particular structure for accomplishing the objectives of this invention. Having thus described my invention what I claim is:

1. A camera accessory to be associated with a conventional camera having a vertical and horizontal format, comprising: a grip having a handle formed and angled to suit the anatomical features of the human hand in a comfortable holding position, adjustable means for associating said grip in a position under and proximate to said manual adjusting lens when pictures are being taken in a vertical or horizontal format, said adjustable means constraining movement of said grip between its various positions, said grip being selectably positionable in both a first grip retaining position and a second grip retaining position, said first grip retaining position designating the location of said grip as being proximately disposed and under said lens whereby it can be maintained in said hand in order that a picture with a horizontal format can be taken by focusing and supporting said camera with said hand, said second grip retaining position designating the location of said grip as being disposed in the same manner as said first grip retaining position in order that pictures with a vertical format can be taken, said grip being disposable to enable the handle of the grip to be maintained in one hand in a manner that permits the thumb and at least one finger to manipulate said manual lens adjusting means in both said first and second grip retaining positions, and means for selectably locking said grip in said first and second grip retaining positions, whereby said camera can be focused and supported simultaneously with one hand and pictures can be taken in both the vertical and horizontal formats.

2. A camera accessory, as defined in claim 1, said adjustable means being a quadrant slide portion associatable with the front of the camera proximate to said manual lens adjusting means, said quadrant slide portion having a first grip retaining portion and a second grip retaining portion for selectably positioning said grip in said first and second grip retaining positions, said quadrant slide portion being arcuate shape and extending under and around said manual lens adjusting means, said quadrant slide portion having a channel formed therein extending the length of said quadrant slide portion, said grip being slidably associated with said channel and movable from said first grip retaining position to said second grip retaining position, whereby said grip can be selectably moved from one position to another with relation to the quadrant slide portion by sliding said means of associating said grip with the quadrant slide portion along the channel of said quadrant slide portion to enable pictures to be taken in both the horizontal and vertical formats.

3. A camera accessory as defined in claim 2, wherein said grip has a flat rear edge that rests against said quadrant slide portion and a bearing screw with a circular head received by a threaded socket in said flat rear edge, said quadrant slide portion receiving said circular head for slidable association in said channel portion, said channel portion having an arcuate countersunk slot at the bottom thereof sized to slidably receive said circular head of said bearing screw therein to act as a track for said bearing screw, to enable the grip to be disposed with relation to the lens adjusting means of the camera proximately for taking pictures in both the vertical and horizontal formats.

4. A camera accessory as defined in claim 2, including: a pair of spring biased set buttons each having a dome portion, one of said set buttons being disposed in each of said grip retaining portions, said set buttons having a locked and a released position, said grip having a cam actuating means with a cam surface protruding outward of a set button opening in said rear flat edge portion of said grip portion, each of said set buttons being disposed to protrude outward into said set button opening when said flat edge of said grip retaining portion is aligned therewith, said cam actuating means being disposed to be moved in order that its cam surface can depress one of said set buttons to its released position when actuated, whereby said grip is maintained in its locked position when aligned with one of said grip retaining portions and one of said set buttons is in its locked position and said grip portion can be caused to slide along said quadrant slide portion by first moving said cam actuating means to depress one of said set buttons to its released position.

5. A camera accessory as defined in claim 3, wherein said quadrant slide portion has a bracket portion extending transversely therefrom at the bottom thereof for the width of the camera, said bracket portion having a slot therein which enables it to be removably associated with a socket screw associated with the bottom of the camera and an upright projecting portion at its rear to enable said bracket portion to wrap around the camera at the rear thereof when said quadrant slide portion is associated with the camera in its operable position.

6. A camera accessory as defined in claim 1, said grip having a removable portion which is removably associated therewith and interchangeable with other removable portions, and means for associating said removable portion with said grip, whereby said grip can have its attitude changed and it can be universally adaptable to a variety of cameras wherein the lens adjusting means is of a different size or is located differently with respect to the bottom of said camera.

7. A camera accessory, as defined in claim 6, wherein said grip has a main handle portion and a top associating portion, said removable portion being interposed between said top associating portion and said main handle, said main handle and said other portions being removably held together by stud member means.

References Cited by the Examiner

UNITED STATES PATENTS 2,697,390  12/1954  Kindelberger _____ 95—86 X
2,961,937  11/1960  Karpf _____ 95—86

FOREIGN PATENTS 1,094,521  12/1954  France.

JOHN M. HORAN, *Primary Examiner.*